United States Patent [19]

Delich

[11] Patent Number: 5,230,221

[45] Date of Patent: Jul. 27, 1993

[54] CHILLING DOOR FOR VACUUM TUMBLERS AND MASSAGERS

[75] Inventor: David Delich, Memphis, Tenn.

[73] Assignee: Liquid Air Corporation, Walnut Creek, Calif.

[21] Appl. No.: 532,689

[22] Filed: Jun. 4, 1990

[51] Int. Cl.⁵ .................................................. F25B 19/00
[52] U.S. Cl. .................................. 62/100; 62/266; 62/268; 62/381; 62/449
[58] Field of Search ............... 62/100, 268, 346, 381, 62/266, 449

[56] References Cited

U.S. PATENT DOCUMENTS

| | | | |
|---|---|---|---|
| 2,426,368 | 8/1947 | Mayne et al. | 62/268 |
| 3,015,219 | 1/1962 | Veyrie | 62/381 |
| 3,213,634 | 10/1965 | Granata | 62/381 |
| 3,765,189 | 10/1973 | Le Diouron | 62/346 |
| 4,033,142 | 7/1977 | Schorsch et al. | 62/381 |
| 4,528,819 | 7/1985 | Klee | 62/266 |

FOREIGN PATENT DOCUMENTS 522836 6/1940 United Kingdom .

Primary Examiner—Ronald C. Capossela
Attorney, Agent, or Firm—Oblon, Spivak, McClelland, Maier & Neustadt

[57] ABSTRACT

Disclosed is an apparatus and method for cooling a product in a vacuum chamber which utilizes a door mounted in an opening portion of a vacuum tumbler chamber, a mechanism mounted on the door for injecting a coolant fluid into the tumbler chamber, a mechanism for rotating the tumbler chamber relative to the door and a vacuum mechanism for exhausting the coolant fluid from the tumbler chamber. The process includes the method of cooling a product in a vacuum chamber and which includes the steps of depositing the products in the vacuum chamber, subjecting the chamber to a vacuum, rotating the chamber, applying a coolant fluid to the products in the chamber; and exhausting the coolant fluid from the chamber by vacuum.

14 Claims, 4 Drawing Sheets

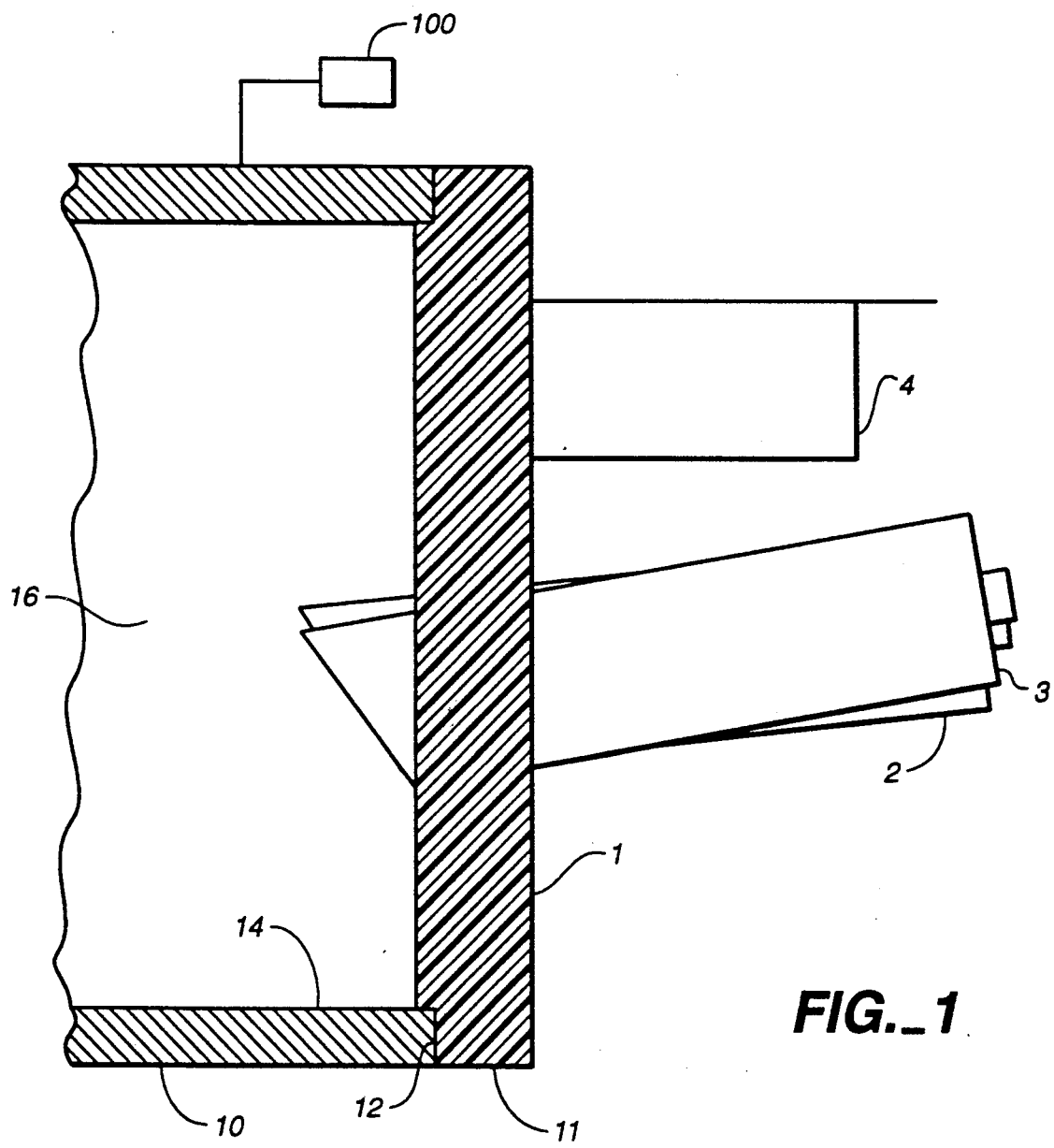
FIG._1

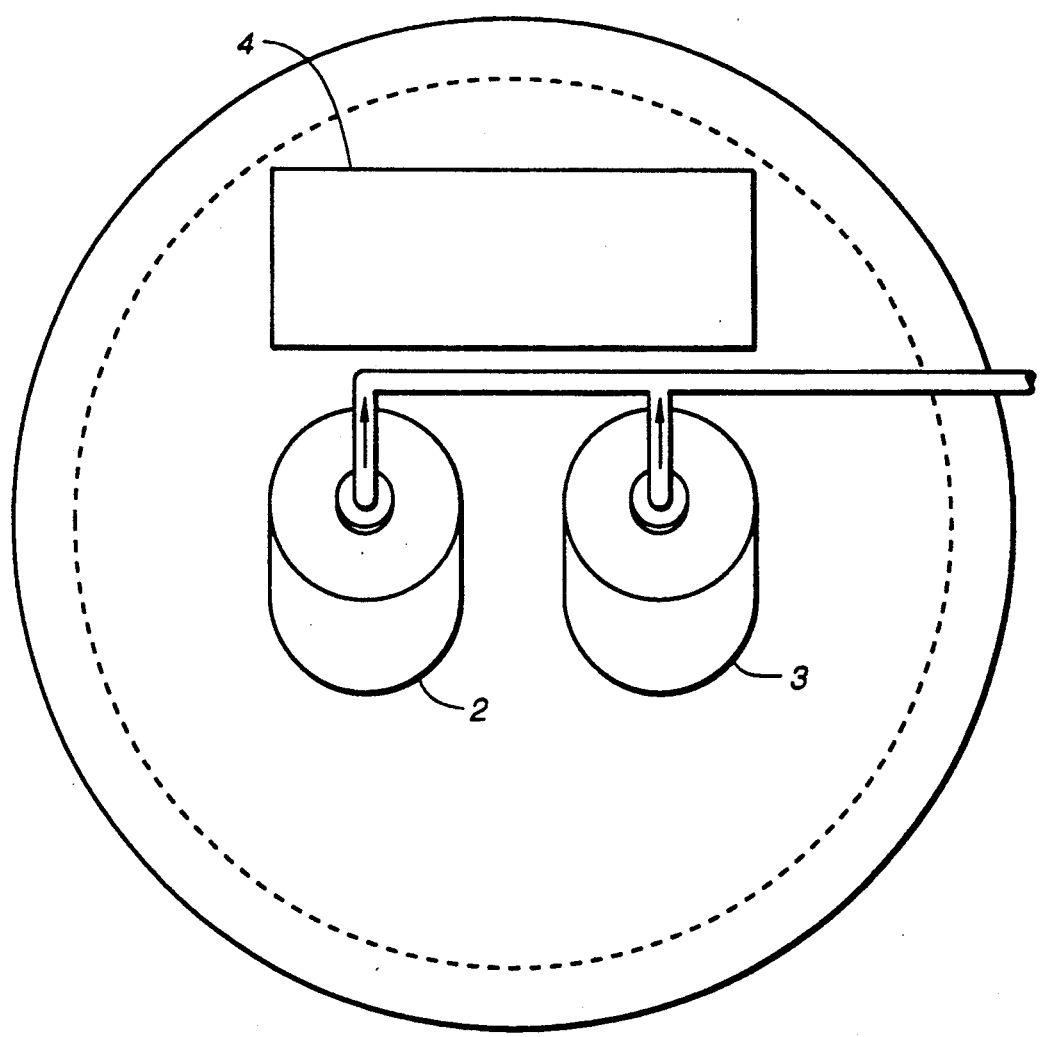
FIG._2

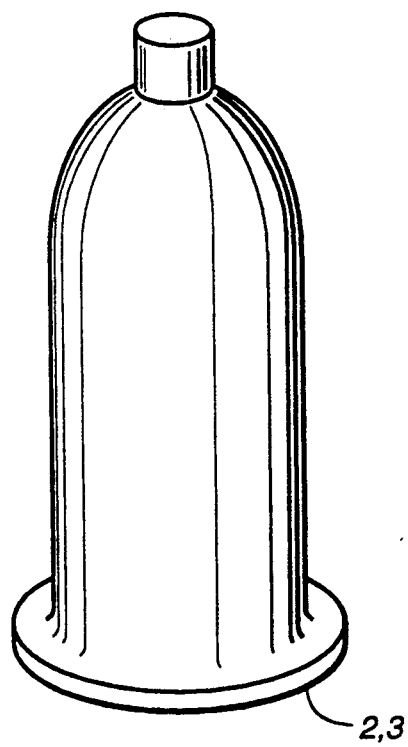
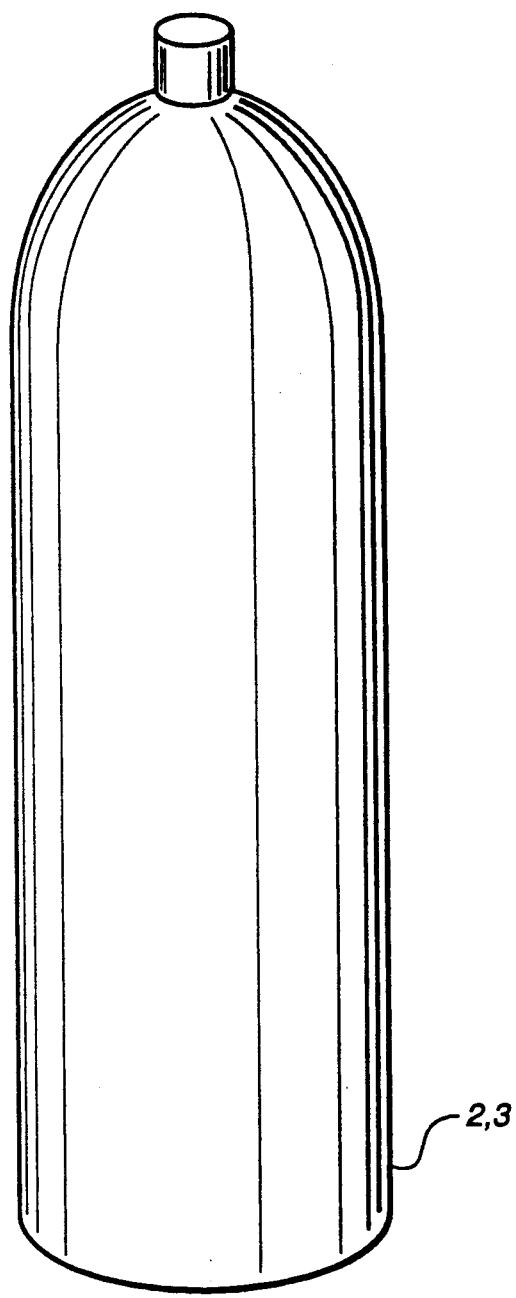
FIG._3A          FIG._3B

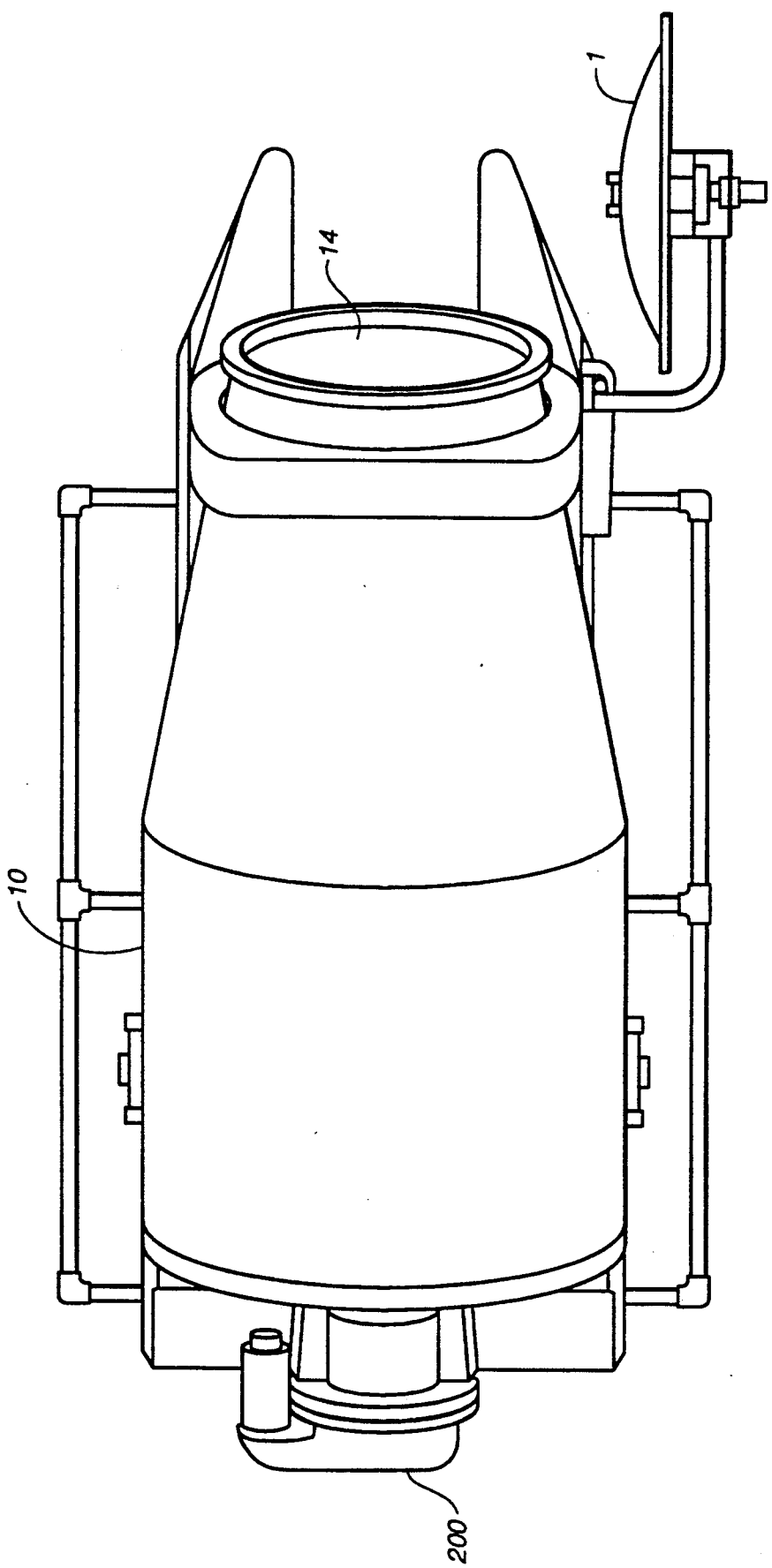
FIG._4

CHILLING DOOR FOR VACUUM TUMBLERS AND MASSAGERS

BACKGROUND OF THE INVENTION

1. Field of the Invention

Disclosed is a chilling door for vacuum tumblers and massagers and a corresponding process which utilizes a vacuum mix to assimilate marinades and other solubles into various products, including meat.

2. Description of the Background

Processes for assimilating solubles into food products are known but these processes have been found not to be efficient insofar as they require a time consuming process of injection and ice water addition which upsets the product mixture moisture ratios. Ice water addition has been found to dilute the added solubles and product mixture ratios so that the need for developing an alternative method has been recognized.

SUMMARY OF THE INVENTION

An object of the present invention is to provide an apparatus and method which serves to overcome the drawbacks and deficiencies of the prior art.

A further object of the present invention is to provide an apparatus and process which allows the solubles to be assimilated into the product through vacuum action and to provide a safe, reliable and effective process which eliminates the time consuming process of injection and ice water addition so as to therefore avoid upsetting the product mixture moisture ratios.

The present invention, through experimentation, has demonstrated that products accept and retain added solubles better if the product is cold, usually in the range of 30°-35° F. In accordance with the present invention, a chilling apparatus is provided for a vacuum tumbler chamber which includes a stationary door mounted in an open portion of the tumbler chamber, a mechanism mounted on the door for injecting a cooling fluid into the chamber; a mechanism for rotating the tumbler chamber relative to the stationary door and a vacuum mechanism for exhausting the cooling fluid from the tumbler chamber.

A process is also disclosed for cooling products in a vacuum chamber, which includes the steps of depositing the products in the vacuum chamber; subjecting the chamber to a vacuum; rotating the chamber; applying a coolant fluid to the products in the chamber; and exhausting the coolant fluid from the chamber by vacuum.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a cross-sectional view of a chilling door attached to a vacuum tumbler in accordance with the present invention;

FIG. 2 shows a front view of the chilling door and vacuum tumbler of FIG. 1;

FIGS. 3A and 3B illustrate different types of snow horns for food freezing and chilling in the chilling door shown in FIG. 1; and FIG. 4 shows tumbler assembly which can be utilized in the present invention.

DESCRIPTION OF THE PREFERRED EMBODIMENT

The food industry has developed a process where various products, primarily meat, require a vacuum mix to assimilate marinades and other solubles into the product. Vacuum tumbling or mixing is accomplished in a cylindrical vessel in which the product is deposited, solubles are added, a vacuum is applied, and then the product is mixed and the solubles are mixed in with the product by rotation of the cylindrical vessel. The process allows the solubles to be assimilated into the product through the action of the vacuum. The process has been found to be highly successful, eliminating the lengthy process of injection and ice water addition which upsets the product mixture moisture ratios.

Experimentation has shown that products accept and retain the added solubles better if the product is cold, usually in the range of 30°-35° F. as discussed above. Ice water addition serves to dilute the added solubles and product mixture ratios so that an alternative method was felt to be necessary. $CO_2$ solid (snow) may be added to these mixtures without the dilution of solubles, and assist in their assimilation. The method of $CO_2$ addition may be accomplished by using the mixing action of the blender mixer tumbler in conjunction with a door assembly in which $CO_2$ is added via snow horns mounted to the door assembly, which are angled to provide maximum coverage in the tumbler massager mixer. The door contains at least one high velocity snow horn 2, 3 and an exhaust plenum 4 to exhaust the resultant $CO_2$ vapor.

The door 1 is manufactured of ultra-high molecular (UHMW) nylon or Teflon TM machined to cover the loading opening 14 on the existing unit. When using two snow horns, the snow horns 2, 3 are mounted onto the door in a stationary position at angles of 65° and 75° to vertical to allow coverage inside the chamber 16. The snow horns are also canted 10° and 12° horizontally respectively at an opposite angle of the plane of rotation of the vessel. These angles therefore allow full discharge of $CO_2$ snow to be folded into the product and allow consistent temperature reduction for the product. The UHMW nylon or Teflon TM construction of the door 1 allows the cylindrical vessel to be rotated, by allowing the door 1 to float or slide on the surface ring 12 of the loading opening 14, thus resulting in the door 1 remaining stationary with respect to the chamber 16 so that the angles of the horns 2, 3 described above are not compromised. When the desired temperature is reached, the door 1 may be removed to discharge or further process the product.

The chilling door 1 for a vacuum tumbler and massager thus serves as an ancillary piece of equipment which can be placed over the opening 14 of the tumbler 10, with the tumbler door being swung away, so as to inject $CO_2$ snow and capture the $CO_2$ vapor for exhaust removal. When the tumbler 10 is in an inclined position, two snow horns set at different angles as described above provide a snow trajectory aimed to disperse the refrigerant $CO_2$ snow throughout the food product in the chamber 16 of the tumbler 10. The exhaust port or plenum 4 is positioned so as to capture the $CO_2$ vapor for removal. The $CO_2$ chilling door is therefore constructed so as to allow rotational tumbling of the food product by a conventional rotary mechanism 100, 200 so as to ensure uniform application of the refrigerant snow.

The vacuum tumbler/massager therefore functions as a mechanism for processing food products for the purpose of tenderizing and for flavor enhancement or addition of food products. The process allows solubles to be assimilated into the product through the vacuum action. This activity is most efficiently performed if the product is cold as indicated above and kept cold throughout the processing cycle, which can run as long as eight hours. An alternative technique for maintaining cold temperatures is to add ice water, a condition which, however, otherwise dilutes the solubles and adversely affects the product moisture levels.

As described above, illustrated in FIG. 1 is a circular tumbler door 1, which has a diameter to match that of the opening 14 of the tumbler 10. The tumbler door 1, being made of UHMW nylon or Teflon TM, is formed of a food grade polymer. The door 1 has an undercut portion 12 with a lip 11 for purposes of mating the tumbler opening 14. The door 1 is bored for the purpose of accommodating snow horns 2, 3 and the exhaust plenum 4. FIG. 2 serves to illustrate a front view of the snow horns 2, 3 along with the exhaust plenum 4. Each snow horn may have a brass nozzle which may be angled in this particular case at 85°. The exhaust plenum 4 is appropriately sized to accommodate $CO_2$ vapor removal. FIG. 3 serves to illustrate two different types of snow horns 2, 3 which may be utilized in accordance with the present invention. The diameter of the snow horns may vary from 6 to 10 inches and their height may vary from 13 to 26 inches. The snow horns illustrated allow for cryogenic freezing and chilling so as to minimize bacteria growth, assure texture, consistency, color, flavor and fragrance of the food products, extend shelf life and thus increase profits and productivity. The horns have a hemispherical end and may be made of stainless steel. The nozzles provided at an end portion of each of the snow horns may be made of brass and held in place with a stainless steel nut welded in place. The horns are welded, and may require the additional support of a bracket or can be secured in place. FIG. 4 shows the overall construction of a tumbler installation which can be used in accordance with the present invention. A motor 200 is used to rotate the tumbler 10.

Obviously, numerous modifications and variations of the present invention are possible in light of the above teachings. It is therefore to be understood that within the scope of the appended claims, the invention may be practiced otherwise than as specifically described herein.

I claim:

1. A chilling apparatus for a vacuum tumbler chamber, which comprises:
   a stationary door mounted in an opening portion of said tumbler chamber;
   means mounted on said door for injecting a coolant fluid into said tumbler chamber;
   means for rotating said tumbler chamber relative to said door; and
   vacuum means mounted on said door for exhausting said coolant fluid from said tumbler chamber.

2. A chilling apparatus as claimed in claim 1, wherein said means for injecting a coolant fluid comprises at least one horn mounted on said door for injecting said coolant fluid into said tumbler chamber.

3. A chilling apparatus as set forth in claim 2, wherein said means for exhausting the coolant fluid from said tumbler chamber comprises an exhaust plenum connected to said door.

4. A chilling apparatus as claimed in claim 2, wherein said at least one horn comprises a plurality of horns.

5. A chilling apparatus as claimed in claim 4, wherein said coolant comprises refrigerant $CO_2$ snow.

6. A chilling apparatus as set forth in claim 1, wherein said means for exhausting the coolant fluid from said tumbler chamber comprises an exhaust plenum connected to said door.

7. The chilling apparatus as claimed in claim 1, wherein said chamber comprises a cylindrical vessel.

8. The chilling apparatus as claimed in claim 1, wherein said chamber comprises a blender mixer vessel chamber.

9. A process for cooling a product in a vacuum chamber having a door, which comprises:
   depositing said product in said vacuum chamber;
   subjecting said chamber to a vacuum;
   rotating said chamber while maintaining said door stationary;
   applying a coolant fluid through said door to said product in said chamber; and
   exhausting the coolant fluid through said door from said chamber by vacuum.

10. The process as set forth in claim 9, wherein said coolant fluid comprises $CO_2$ vapor.

11. The process as set forth in claim 9, wherein said step of applying a coolant fluid comprises uniformly applying a coolant fluid to said product in said chamber.

12. The process as claimed in claim 9, which comprises air-tightly securing said door to said chamber and mounting at least one coolant horn to said door.

13. A process as claimed in claim 9, wherein said product comprises a food product and wherein solubles are added to said products prior to rotating said chamber.

14. The process as set forth in claim 9, which comprises adding solubles to said product prior to rotating said chamber so as to assimilate said solubles into said product through said vacuum.

* * * * *